(12) United States Patent
Strazzanti

(10) Patent No.: US 6,491,416 B1
(45) Date of Patent: Dec. 10, 2002

(54) HEADLIGHT MASKING METHOD AND APPARATUS

(75) Inventor: Michael Strazzanti, Auburn, OH (US)

(73) Assignee: Illume, L.L.C., Auburn, OH (US)

( * ) Notice: Subject to any disclaimer, the term of this patent is extended or adjusted under 35 U.S.C. 154(b) by 0 days.

(21) Appl. No.: 09/865,402

(22) Filed: May 25, 2001

(51) Int. Cl.[7] .......................... B60Q 1/00; F21V 21/28
(52) U.S. Cl. .................. 362/464; 362/318; 362/512; 362/467; 427/106
(58) Field of Search ............................ 362/307, 311, 362/464, 465, 466, 267, 318, 512, 539, 467; 315/82, 83; 427/106, 165

(56) References Cited

U.S. PATENT DOCUMENTS

| | | |
|---|---|---|
| 2,628,927 A | 2/1953 | Colbert et al. |
| 2,740,732 A | 4/1956 | Peck et al. |
| 3,001,901 A | 9/1961 | Barkley |
| 3,020,376 A | 2/1962 | Hofmann et al. |
| 3,512,876 A | 5/1970 | Marks |
| 3,708,219 A | 1/1973 | Forlini et al. |
| 4,142,229 A | 2/1979 | Hulbert, Jr. |
| 4,209,825 A | 6/1980 | Shackelford |
| 4,727,458 A | 2/1988 | Droste et al. |
| 4,814,960 A | 3/1989 | Liu |
| 4,839,779 A | 6/1989 | Kasboske |
| 4,868,726 A | 9/1989 | Segoshi |
| 4,985,816 A * | 1/1991 | Seko et al. .................. 362/303 |
| 5,023,758 A * | 6/1991 | Allen et al. .................. 362/318 |
| 5,111,105 A | 5/1992 | Yamamoto |
| 5,438,486 A * | 8/1995 | McNair ........................ 362/509 |
| 5,463,491 A | 10/1995 | Check, III |
| 5,467,217 A | 11/1995 | Check, III et al. |
| 5,517,389 A | 5/1996 | Myers |
| 5,660,462 A | 8/1997 | Bockley et al. |
| 5,728,251 A | 3/1998 | Check, III |
| 5,829,870 A * | 11/1998 | Remillard et al. ........... 362/510 |
| 5,938,323 A | 8/1999 | McMahan |
| 6,017,138 A | 1/2000 | Reiss et al. |
| 6,114,405 A | 9/2000 | Zhuang et al. |
| 6,126,301 A | 10/2000 | Altunay et al. |
| 6,156,239 A | 12/2000 | Saxe et al. |

* cited by examiner

Primary Examiner—Sandra O'Shea
Assistant Examiner—Ali Alavi
(74) Attorney, Agent, or Firm—Watts, Hoffman, Fisher & Heinke, Co., L.P.A.

(57) ABSTRACT

A headlamp assembly having a headlamp bulb for emitting light and a bulb housing having a light transmissive portion for transmitting light from the headlamp bulb to an illumination zone. The housing is coated with a coating material which covers a selected region of the light transmissive portion of the housing. The coating material is electrically energized to alter an amount of light transmitted from the bulb to the illumination zone. A drive circuit electrically coupled to the coating material energizes the coating material to control a light output from the headlamp assembly.

19 Claims, 3 Drawing Sheets

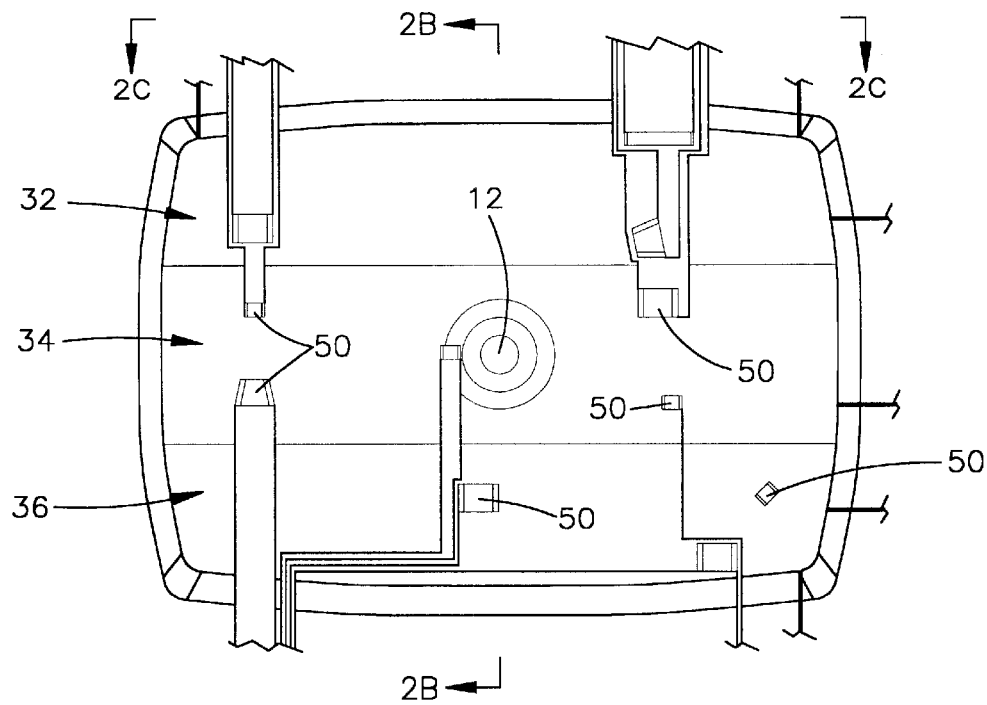
Fig.2A
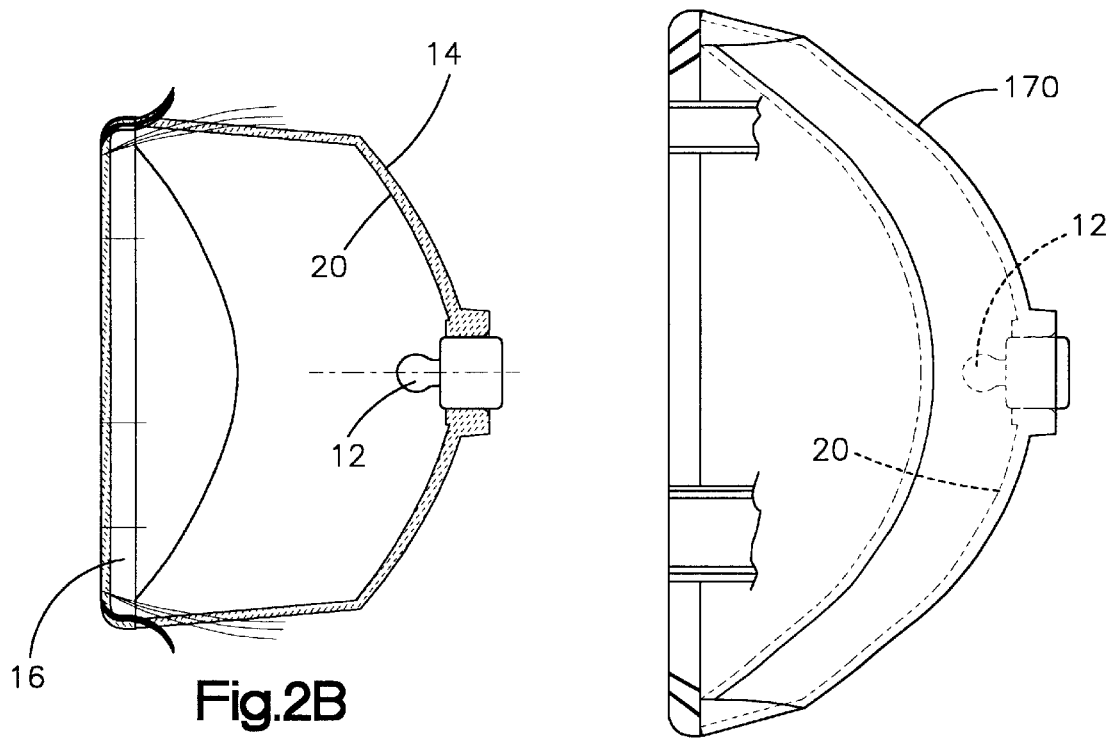
Fig.2B
Fig.2C

HEADLIGHT MASKING METHOD AND APPARATUS

FIELD OF THE INVENTION

The present invention concerns a vehicle headlamp having a control for selectively rendering portions of the headlamp light transmissive under vehicle operator control.

BACKGROUND ART

All motor vehicles include a control for switching between high beam and low beam operation of the motor vehicle headlamps. This control may be implemented by a floor mounted switch but most typically in more recent designed motor vehicles is implemented with a stalk on the vehicle steering column that is easily actuated by a motor vehicle operator.

When the high beam option is selected, the vehicle headlamps are focused in a direction that illuminates further in advance of the vehicle to improve a motorist's ability to see details in his or her line of sight. When an oncoming vehicle approaches, the motorist can switch to low beam operation to avoid temporarily blinding the oncoming driver. Fog lamps are occasionally installed on vehicles to direct a lamp output downward in a direction closer to the vehicle to enable the motorist to more clearly see during rain and foggy conditions.

Vehicle head lamps most typically contain two separate light bulbs that can be independently activated. When one of the bulbs is activated, a low beam lamp output is produced and when a second bulb of the two bulbs is activated a high beam lamp output is provided. In the 1980's when headlamps having halogen light bulbs were first built, the government enacted photometric tests. These tests dictated that light of a high enough intensity to cause spot blindness in other motorists did not reach certain regions in a space in front of a motor vehicle headlamp. Spot blindness was only a problem for halogen lights since these lights produce a much more intense output when compared with non-halogen lamps.

U.S. Pat. No. 5,517,389 to Meyers concerns an electrochromic lamp assembly including a reflector having two or more reflective surfaces. A light source and an electrochromic means is positioned between the light source and at least one reflective surface. Each reflective surface directs light in a different direction. The electrochromic means is capable of blocking light from exiting the lamp assembly from at least one direction.

SUMMARY OF THE INVENTION

The present invention concerns a headlamp assembly for use with a motor vehicle. The headlamp assembly includes regions on a light transmitting portion of an assembly housing that can be selectively controlled to change from opaque to highly transmissive. The headlamp assembly can operate as a fog lamp, can provide a low beam output lamp, can provide a high beam output lamp and can provide various combinations of these lamp operations.

One exemplary embodiment of a headlamp assembly constructed in accordance with the invention includes a headlamp bulb for emitting light from the headlamp assembly that is supported by a bulb housing having a light transmissive portion for transmitting light from the headlamp bulb to an illumination zone. At least a portion of the housing is coated with a coating material which covers a selected region of the light transmissive portion of the housing. By electrically energizing the coating material, its light transmissive properties are controlled, thereby controlling an amount of light transmitted from the bulb to the illumination zone. A drive circuit is electrically coupled to the coating material.

Practice of the exemplary embodiment of the invention gives a motorist direct control of intensity and zones of illumination. The motorist can adjust the illumination intensity and zone for specific traveling conditions, i.e. weather, terrain, time of day etc. This creates a safer environment to operate the motor vehicle.

Practice of the exemplary embodiment of the invention is achieved with one, high intensity bulb supported by a headlamp assembly having a reflective region for directing light through the light transmissive portion of the assembly. This structure produces high beam, low beam and fog lamp outputs without resort to multiple bulbs and bulb housings.

The exemplary embodiment of the invention includes multiple regions that are defined by the coating material. These photometric patches eliminate a need for a bulb shield. Current commercially available bulb shields are made specifically for a high beam, low beam or fog lamp bulb housing. Alternatively, the bulb shield must be mechanically repositioned inside a bulb housing. Either of these two techniques is more complex and costly than a headlamp assembly built in accordance with the present invention.

A preferred coating material is a PDLC material (polymer dispersed liquid crystal) which scatters light rather than absorbing the light to block its transmission. This characteristic greatly reduces heat build up associated with masking a halogen lamp, whose high intensity light output causes a rapid build up of heat in any material which absorbs that light.

These and other objects, advantages and features of the invention will become better understood from a detailed description of an exemplary embodiment of the invention which is described in conjunction with the accompanying drawings.

BRIEF DESCRIPTION OF THE DRAWINGS

FIGS. 2A, 2B and 2C are front plan, side plan, and section views of a headlamp housing that forms part of the FIG. 1 assembly.

EXEMPLARY EMBODIMENT FOR PRACTICING THE INVENTION

Figure 1:
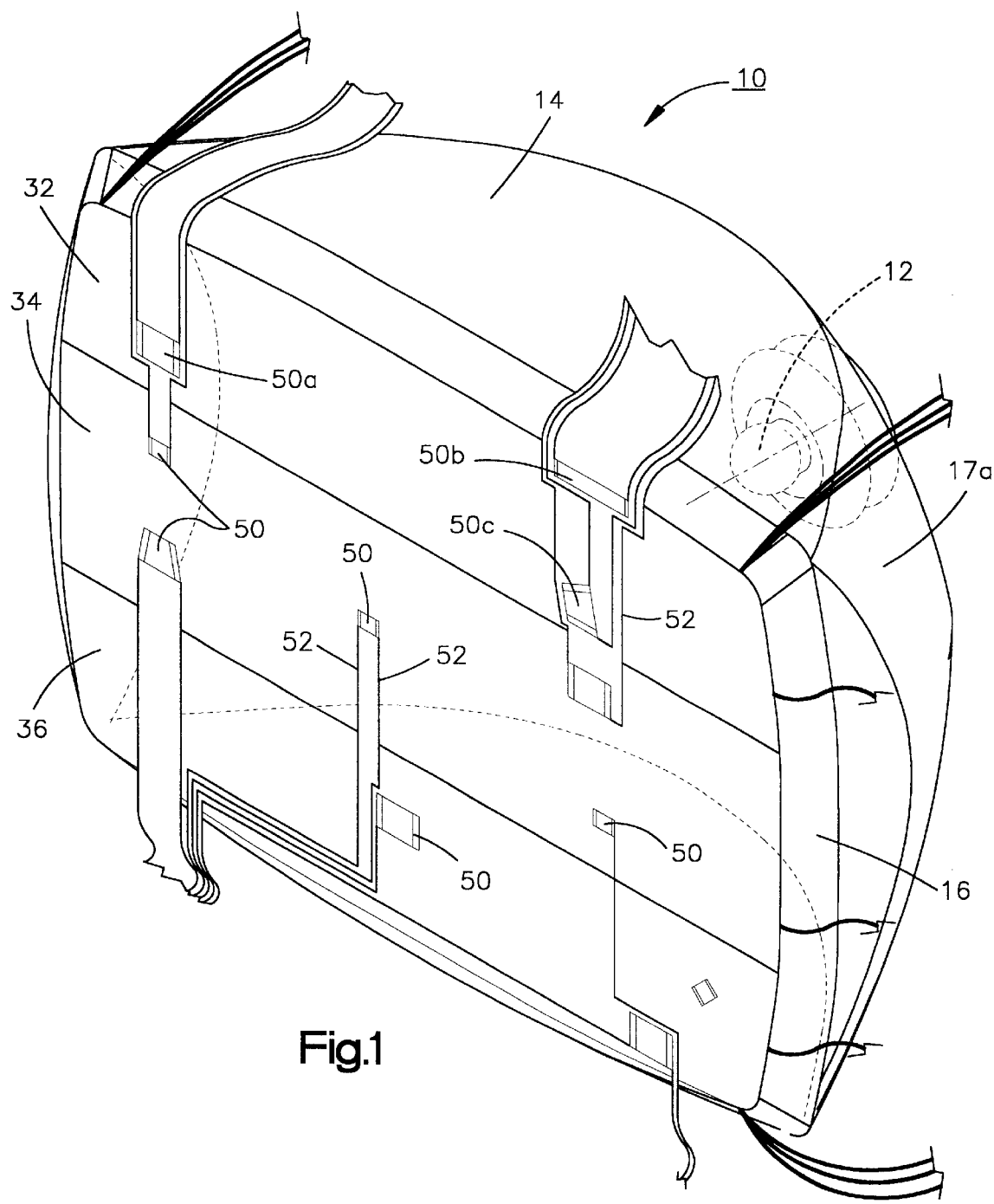
FIG. 1 is a perspective view of a headlamp assembly constructed in accordance with the present invention.

Turning now to the drawings, FIG. 1 illustrates a headlamp assembly 10 that includes a headlamp bulb 12 for emitting light mounted to a bulb housing 14 having a light transmissive portion or lens 16 for emitting light from the headlamp bulb 12 to an illumination zone in front of the headlamp assembly 10. An interior surface 20 of the light bulb housing 14 reflects light reaching the surface 20 back into the housing interior so that it will exit the housing through the light transmissive portion 16.

The light transmissive portion of the housing is coated at specified regions with a coating material. When these regions are electrically energized the coating material is rendered more light transmissive to alter the amount of light transmitted from the bulb to the illumination zone. A drive circuit 30 (see FIG. 3) electrically coupled to the regions of coating material energizes the coating material and thereby control a light output from the headlamp assembly.

In accordance with the exemplary embodiment of the invention the light transmissive portion of the housing is coated with three bands 32, 34, 36 of the coating material. These bands are independently energized to adjust the light output from the headlamp assembly 10. The headlamp assembly 10 is for a motor vehicle. The opacity of the three bands 32, 34, 36 of coating material are selectively controlled to adjust the opacity of the three bands thereby producing a high beam output, a low beam output and a fog lamp output, respectively, from the headlamp assembly 10. In addition to the three bands 32, 34, 36, the disclosed embodiment of the invention includes a plurality of smaller regions 50 of coating material that are coupled to the drive circuit 30 by means of conductors 52 routed across the light transmissive portion of the housing. Both the bands 32, 34, 36 and additional smaller regions or patches 50 are most preferably built using cut to size sheets of a polymer dispersed liquid crystal material, known as PDLC material. One example of a commercially available PDLC material is SPD film from Research Frontiers Incorporated, having a business address of 240 Crossways Park Drive, Woodbury, N.Y. 11797. This sheet of material can be cut to an appropriate shape and applied to the light transmissive portion of the bulb housing.

The coating material may be affixed to the inside of the lens 16 with a translucent adhesive to protect the material from weathering that would occur outside the lens 16. The coating material may also be applied to an outer surface of the lens 16 using a protective laminate. Additionally the coating material may be a prefabricated panel, which is then clipped or locked into place when the headlamp assembly housing is constructed.

The patches 50 are solely for photometric purposes and are not under direct control of the motorist. The patches are rendered opaque at any time that the headlamp bulb 12 is outputting light to create a field of illumination which is in accordance with governmental photometric standards. The patches 50 are made translucent or light transmitting by applying a current to the patches only when the headlamp bulb 12 is not producing light.

Drive Circuit 30

Figure 3:
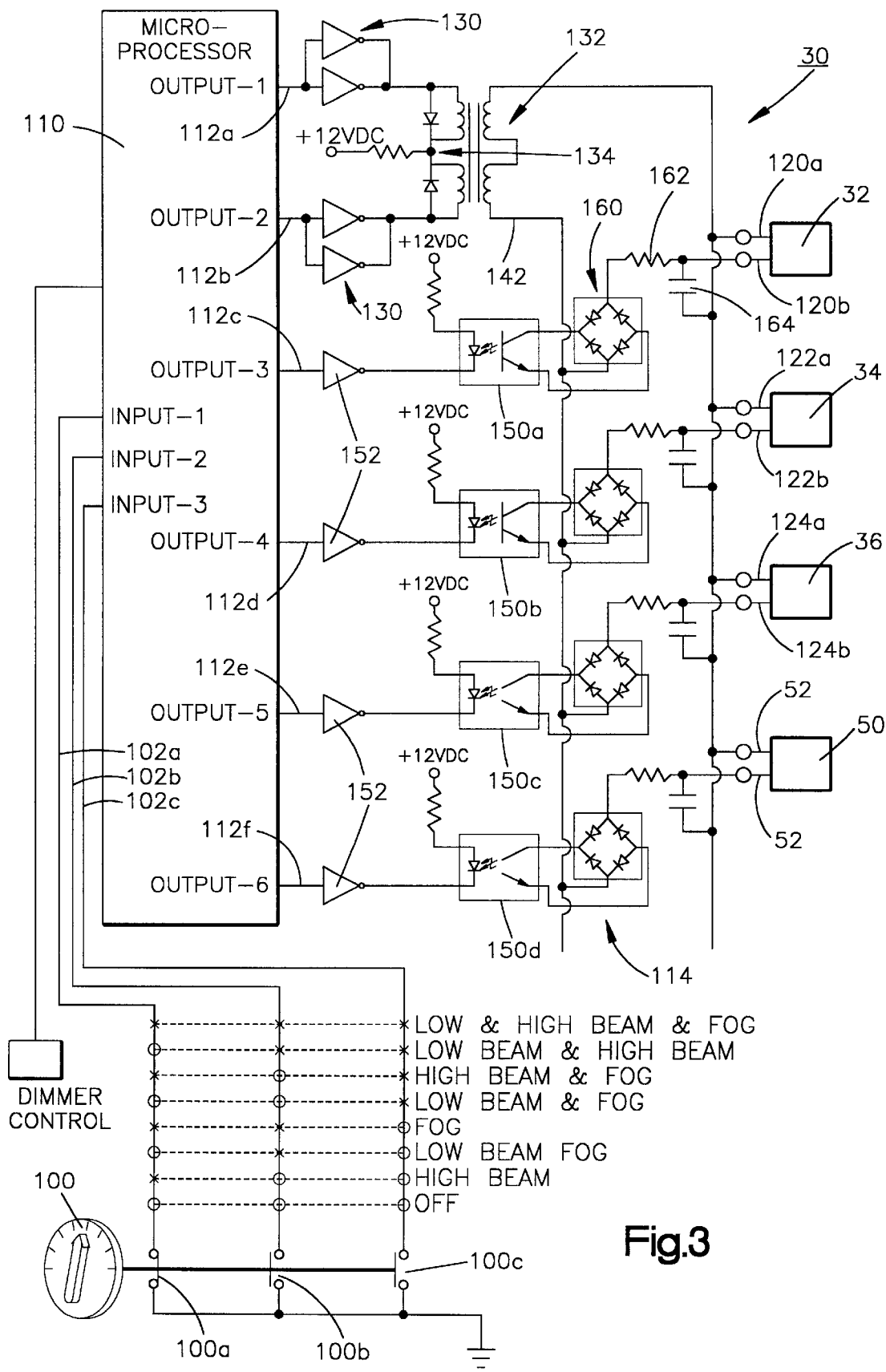
FIG. 3 is a schematic depiction of a drive circuit for activating control components of the headlamp assembly depicted in FIG. 1.

Referring now to FIG. 3, the drive circuit 30 includes a user interface that includes a switch selector 100 for controlling inputs 102a, 102b, 102c to a programmable controller 110. The programmable control includes a control program operating system that responds to the signals on the inputs 102a, 102b, 102c to produce on a set of controller outputs 112a–112f. A driver circuit 114 is coupled to the coating material to apply a pulse width modulated signal to the coating material for altering the light transmissive characteristics of said coating material. In accordance with the disclosed exemplary embodiment of the invention, the highest light transmission occurs when the band is activated with a large alternating current square wave signal.

In accordance with the disclosed embodiment of the invention, there are three bands 32, 34, 36 of coating material. Each band is independently controlled by the controller 110. Thus, by referring to FIG. 3, one sees that the band 32 is coupled to two conductors 120a, 120b, the band 34 is coupled to the two conductors 122a, 122b, the band 36 is coupled to the two conductors 124a, 124b. The light transmitting status of the other smaller regions 50 are controller by an output 112f so that the controller activates each of these regions to achieve approximately the same amount of light transmission. In accordance with the preferred embodiment of the invention, the bands 32, 34, 36 each overlap with one or more of the additional small regions or patches 50.

Current is applied to the PDLC patches 50 when the headlamp bulb 12 is not emitting light. This provides an appearance of a clear headlamp lens. At any time the headlamp bulb 12 is producing light all the regions 50 are deprived of current so as to be in an opaque state. This prevents light from the bulb 12 from reaching photometric tests points located in front of the patches.

The programmable controller is programmed so that when one of the bands is driven to a state wherein the material that makes up that band is highly light transmissive, its associated smaller regions of material are in a state of low transmission, i.e. they are highly opaque. Consider the topmost band 32 in FIG. 1. This band 32 is covered in selected regions or zones by three additional smaller regions or patches 50a, 50b, 50c. When the band 32 is activated by the controller 110 to be highly light transmissive, the regions or patches 50a, 50b, 50c are not activated or energized, and consequently, are opaque. Since all patches are coupled to the same output from the controller 110 controls all the patches, when the patches 50a, 50b, 50c are opaque, the patches applied to overlap other bands of the lens are also opaque.

The switch 100 has three contacts 100a, 100b, 100c so that $2^3$ or eight different control signal states can be generated as indicated in Table 1 that follows.

TABLE 1

Control Signal States

| | |
|---|---|
| Lights Off | Current applied to no bands |
| High Beam On | Current applied to band 32, none on 34, 36 |
| Low Beam On | Current applied to band 34, none on 32, 36 |
| Fog Beam On | Current applied to band 36, none on 32, 34 |
| Low Beam with Fog | Current applied to band 34, 36, not 32 |
| High Beam with Fog | Current applied to bands 32, 36, not 34 |
| Low Beam with High Beam | Current applied to bands 32, 34, not 36 |
| Low Beam, High Beam and Fog | Current applied to all bands |

It is a requirement of the exemplary embodiment of the present invention that when the bulb 12 is extinguished, a current is applied to all three bands 32, 34, 36. This renders the PDLC material of the bands 32, 34, 36 light transmissive for cosmetic purposes. Automotive companies spend much money on headlamp design every year to create cosmetically attractive bulb shields and practice of the invention helps in achieving an attractive appearance.

So long as the controller 110 is powered up by a signal derived from the twelve volt signal from the motor vehicle battery, the controller 110 provides pulsed on/off signals at the two outputs 112a, 112b. These signals have a frequency of about 64 hertz and have a duty cycle of 50%. These pulses pass through high current inverter drivers 130 to a step up transformer 132. The step up transformer 132 has a center tap 134 coupled to the twelve volt output from the vehicle battery. The transformer produces an alternating square wave signal across two bus conductors 140, 142 that alternates back and forth between +40 volts and −40 volts at a frequency of 64 hertz.

As stated above, the programmable controller 110 also produces signals at outputs 112c, 112d, 112e, 112f for controlling a light transmissive characteristic of the bands 32, 34, 36 and collectively the regions 50. These outputs from the controller 110 are 128 hertz, pulse width modulated, square waves. The width of the pulse determines the light intensity from the bulb 12 transmitted by an associated control element of coating material. Each of the outputs 112c, 112d, 112e, 112f is coupled to an associated optoisolator 150a, 150b, 150c, 150d through an inverting, high current drive amplifier 152. Consider the output 112c. When this output goes high, the inverter produces a low signal which turns on a light emitter of the optoisolator 150a. This in turn turns on a transistor of the optoisolator 150a, thereby transmitting the pulse to a bridge rectifier 160. The bridge rectifier acts as a valve to transmit the 64 hertz signal across the bus conductors 140, 142 across an associated control element.

The pulse width of the 128 hertz signal at the outputs 112c, 112d, 112e, 112f determines the light intensity of the light transmitting portions of the housing. The pulse width controls the on time of a bridge rectifier by switching the associate optocoupler on and off. This in turn determines a length of time that the 64 hertz signal from the transformer is applied to an associate PDLC coating member. A resistor 162 (10 k) and a capacitor 164 (1 microfarad) determining the rate at which the voltage can rise across the PDLC. Given more time (wider pulse), the voltage will go higher and increase the light intensity transmitted through an associated control element such as one of the bands 32, 34, 36. Given less time (narrow pulse), the voltage will be lower and decrease the light intensity. The controller can control the pulse width in increments of 30 microseconds (0.000030 seconds) providing good resolution on light intensity control. In one exemplary embodiment, however, the coating material is either rendered essentially transparent due to application of the +/−40 volt signals from the transformer or is rendered opaque by blocking all signals from the transformer. The highly transparent state for the band 32, for example, is achieved by application of a constant high output signal at the output 112c from the controller 110. In accordance with alternate procedures, a dimming of the light transmission is achieved through pulse width modulating an output from the controller 110 with a controlled pulse width signal. Using the programming capability of the controller 110 it is possible to control a level of opacity of each individual PDLC band in order to optimize the headlamp assembly performance. The operating system of the controller 110 can be programmed with preset levels of opacity based upon the type of beam selected. For example, if may be that the optimum "low beam with fog" lamp combination emits a preferred amount of light by making the low beam PDLC band 34 20% opaque. This value can be programmed or adjusted depending on the configuration of the lamp assembly and is generally an empirically determined factor. It may also be possible to use a master dimming switch that controls the opacity of the three PDLC bands 32, 34, 36. Note, in this regard, the opacity of the patches 50 is constant so the dimming capacity noted above does not apply to these regions.

The bulb housing 14 is most preferably made from a front, light transmissive portion 16 that functions as a lens and an interior light reflecting surface 20. A rear wall 170 of the assembly 10 supports the bulb 12 in relation to the front, light transmissive portion so that when the bulb is energized to emit light those portions of the light transmissive portion 170 not blocked by sheets of opaque PDLC material transmit light to an illumination zone or region. Both the light transmissive and reflector sections 170, 172 are molded plastic parts. During assembly, the bulb 12 is mounted to the reflector section 172 and conductors for energizing the PDLC regions are attached to the reflector. The PDLC regions are attached to the light transmissive portion 170 of the housing. In the disclosed embodiment of the invention, the bands 32, 34, 36 are supported on an inner surface of the light transmissive section 170. The PDLC areas 50 are attached to an outer surface of the light transmissive section 170. The reflector section 172 is most preferably coated with a paint that enhances a light reflecting capacity of an inner surface of the section 172.

The programmable controller 110 most preferably is a microprocessor that receives a DC energization signal from a voltage regulator circuit (not shown) powered by a motor vehicle battery. The microprocessor is programmed with an operating system that periodically senses the status of the input switches and provides appropriate pulse width modulated outputs from the outputs 112a–112f. The use of a microprocessor adds flexibility to a manner in which the PDLC coated regions are activated. In certain instances such flexibility is not needed and a programmed logic array could be used to provide the input sensing and output signal control.

In the exemplary embodiment of the invention, there is no benefit to separate programming of the PDLC patches 50 for different activations of the three PDLC bands 32, 34, 36. However, the photometrics of a vehicle's headlamp depend upon the shape, height and overall dimensions of the car as well as the shape of the bulb housing's reflective surface which is dependent on each vehicle's front end design. Therefore, if some photometric points in front of the headlamp are necessary for a high beam but not a low beam, and if these points were affected by the low beam when it is operated without the high beam, the controller 110 can be programmed to only make the photometric point opaque in the high beam state by selective activation of the patches depending on the high beam/low beam status.

Photometric standards pursuant to 49C.F.R. §571.108(b) are tabulated below and indicate zones of coverage for the PDLC patches 50.

While an exemplary embodiment of the invention has been described with a degree of particularity, it is the intent that the invention include all modifications and alterations from the disclosed design falling within the spirit or scope of the appended claims.

What is claimed is:

1. A headlamp assembly comprising:
   a headlamp bulb for emitting light from the headlamp assembly;
   a bulb housing having a light transmissive portion for transmitting light from the headlamp bulb to an illumination zone, a portion of said housing coated with a coating material which covers a selected region of the light transmissive portion of the housing and which when electrically energized alters an amount of light transmitted from the bulb to the illumination zone; and
   a drive circuit electrically coupled to the coating material for selectively energizing the coating material and thereby controlling a light output from the headlamp assembly.

2. The headlamp assembly of claim 1 wherein the coating comprises a sheet of pliable PDLC material that is affixed to the light transmissive portion of the housing.

3. The headlamp assembly of claim 1 wherein the light transmissive portion of the housing includes multiple bands of the coating material which can be independently energized to adjust the light output from the headlamp assembly.

4. The headlamp assembly of claim 3 wherein the headlamp assembly is adapted for mounting to a motor vehicle, and further wherein there are three bands of coating material applied to the light transmissive portion of the headlamp assembly and further wherein selectively controlling the opacity of the three bands produces a fog lamp output, a low beam output and a high beam output from the headlamp assembly.

5. The headlamp assembly of claim 3 wherein the driver circuit includes a user interface for monitoring multiple inputs that control the light transmissive state of the multiple bands.

6. The headlamp assembly of claim 5 wherein the driver circuit includes a programmable controller coupled to an output circuit that causes the bands to exhibit one of two light transmissive states, a relatively high light transmissive state and a relatively low light transmissive state.

7. The headlamp assembly of claim 3 additionally comprising additional regions of coating material that overlap one or more of the multiple bands of the coating material and wherein the drive circuit is electrically coupled to the additional regions to control a light transmissive state of said additional regions.

8. The headlamp assembly of claim 7 wherein both the additional regions and the bands exhibit one of two light transmissive states, a highly transmissive state and a low transmissive state and further wherein during intervals the drive circuit activates a selected band to render the selected band highly transmissive and further wherein any additional regions that overlap said selected band are activated to a low transmissive state.

9. The head lamp assembly of claim 1 wherein the drive circuit comprises:

a) a user interface including a switch selector;
b) a programmable controller for responding to the setting of the switch selector to produce a set of driver outputs; and
c) a driver circuit coupled to the coating material to apply an alternating signal to the coating material to alter the light transmissive characteristics of said coating material.

10. The head lamp assembly of claim 1 wherein the drive circuit includes a control output for adjusting a level of light transmission from the bulb through a region of said coating material at a high level of light transmission, a low level of light transmission, and at least one intermediate level of light transmission.

11. The head lamp assembly of claim 10 wherein the drive circuit includes a programmable controller that selectively controls a pulse width modulating signal output from the controller for adjusting the light transmission level of an associated region of said coating material.

12. A process for constructing a headlamp assembly comprising:

positioning a headlamp bulb that emits light within a headlamp housing having a light transmissive portion for transmitting light from the headlamp bulb to an illumination zone, applying a coating material to the housing to cover selected regions of the light transmissive portion; and coupling the coating material to a drive circuit for selectively energizing the coating material which when electrically energized renders a region of the light transmissive portion having the coating material more light transmissive to alter light transmitted from the bulb to the illumination zone.

13. The process of claim 12 wherein the coating material is coupled to the light transmissive portions in layers that are isolated from each other to allow independent energization of overlapping layers of said coating material.

14. The process of claim 12 wherein the coating material is organized in multiple bands across a surface of said light transmissive portion of the headlamp assembly which are coupled to the drive circuit independently to allow independent control over the light transmitting characteristics of said bands during operation of the headlamp assembly.

15. The method of claim 12 wherein there are multiple bands of coating material applied to the light transmissive portion of the headlamp assembly and the drive circuit is coupled to the multiple bands to independently control the light transmissive states of the bands to provide a fog lamp output, a low beam output and a high beam output from the headlamp assembly.

16. The method of claim 15 additionally comprising providing an user interface for monitoring multiple inputs that control the light transmissive state of the multiple bands.

17. The method of claim 15 additionally comprising additional regions of coating material that overlap one or more of the multiple bands of the coating material and wherein the drive circuit are coupled to the additional regions to independently control a light transmissive state of the additional regions.

18. The method of claim 12 wherein the energizing of the coating material adjusts a level of light transmission from the bulb through a region of said coating material to a high light transmission state, a low light transmission state, or one or more intermediate light transmission states.

19. The method of claim 12 wherein energizing of the coating material is performed by providing a pulse width modulating signal for adjusting a light transmission state of an associated region of said coating material.

* * * * *